US012596013B2

(12) United States Patent 
Wagner et al.

(10) Patent No.: US 12,596,013 B2 
(45) Date of Patent: Apr. 7, 2026

(54) METHOD AND DEVICE FOR CREATING A DIGITAL MAP AND FOR OPERATING AN AUTOMATED VEHICLE

(71) Applicant: Robert Bosch GmbH, Stuttgart (DE)

(72) Inventors: Andre Wagner, Hannover (DE); Erik Einhorn, Sarstedt (DE); Julian Lindner, Hannover (DE); Matthias Roland, Hildesheim (DE); Maurice Seer, Elze (DE); Nicolas Fischer, Hannover (DE); Pierre Lothe, Hildesheim (DE); Tobias Ritter, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 99 days.

(21) Appl. No.: 18/527,677

(22) Filed: Dec. 4, 2023

(65) Prior Publication Data

US 2024/0200976 A1 Jun. 20, 2024

(30) Foreign Application Priority Data

Dec. 15, 2022 (DE) ..................... 10 2022 213 689.6

(51) Int. Cl.
G01C 21/00 (2006.01)
B60W 60/00 (2020.01)
G06V 20/56 (2022.01)

(52) U.S. Cl.
CPC ....... G01C 21/3841 (2020.08); B60W 60/001 (2020.02); G01C 21/3815 (2020.08); G06V 20/588 (2022.01); B60W 2420/403 (2013.01); B60W 2420/408 (2024.01); B60W 2552/53 (2020.02); B60W 2556/40 (2020.02)

(58) Field of Classification Search
CPC ........... G01C 21/3841; G01C 21/3815; G01C 21/32; G01C 21/26; G01C 21/3807; B60W 60/001; B60W 2420/403; B60W 2420/408; B60W 2552/53; B60W 2556/40; B60W 40/04; B60W 40/02; G06V 20/588; G01S 17/86; G01S 17/89; G01S 17/931
See application file for complete search history.

(56) References Cited

U.S. PATENT DOCUMENTS

| | | | | |
|---|---|---|---|---|
| 2005/0134440 A1* | 6/2005 | Breed | .................... | G08G 1/161 |
| | | | | 701/45 |
| 2008/0074312 A1* | 3/2008 | Cross | ..................... | G06T 15/10 |
| | | | | 342/25 A |

(Continued)

FOREIGN PATENT DOCUMENTS

| | | | | |
|---|---|---|---|---|
| CN | 114170320 A | * | 3/2022 | ............. G06F 18/25 |
| CN | 117406640 A | * | 1/2024 | ......... G05B 19/0423 |
| WO | 2013076589 A2 | | 5/2013 | |

OTHER PUBLICATIONS

Darpa Urban Challenge 2007 Team CarOLO (Year: 2007).*

(Continued)

*Primary Examiner* — Rami Khatib 
(74) *Attorney, Agent, or Firm* — NORTON ROSE FULBRIGHT US LLP

(57) ABSTRACT

A method and first device for creating a digital map. The digital map represents at least one region along a traffic route. A method and second device for operating an automated vehicle along a traffic route is also described.

6 Claims, 2 Drawing Sheets

(56)                    References Cited

U.S. PATENT DOCUMENTS

2010/0045513 A1*    2/2010   Pett ....................... G01S 13/867
                                                         342/25 C
2013/0103301 A1*    4/2013   Becker ................... G01S 13/89
                                                         342/52

OTHER PUBLICATIONS

Massow, et al.: "Deriving HD Maps for Highly Automated Driving
from Vehicular Probe Data," IEEE 19th International Conference on
Intelligent Transportation Systems, ITSC 2016, pp. 1-8; https://
publica.fraunhofer.de/entities/Publication2736deb9-43f6-416c-8ff0-
1b4fbc85e357/details.

* cited by examiner

METHOD AND DEVICE FOR CREATING A DIGITAL MAP AND FOR OPERATING AN AUTOMATED VEHICLE

CROSS REFERENCE

The present application claims the benefit under 35 U.S.C. § 119 of German Patent Application No. DE 10 2022 213 689.6 filed on Dec. 15, 2022, which is expressly incorporated here by reference in its entirety.

FIELD

The present invention relates, among other things, to a method for creating a digital map, wherein the digital map represents at least one region along a traffic route, and to a method for operating an automated vehicle along a traffic route.

SUMMARY

According to an example embodiment of the present invention, the method for creating a digital map, wherein the digital map represents at least one region along a traffic route, comprises a step of receiving a plurality of data sets, wherein each data set is transmitted from a vehicle that travels through the region along its own trajectory, wherein each data set comprises the vehicle's own trajectory and surrounding area data values, wherein the surrounding area data values comprise radar data values and video data values, wherein the radar data values are detected by means of a radar sensor and the radar data values represent surrounding area features in this region by means of a radar signature, wherein the video data values are detected by means of a video sensor and represent at least boundary features along the traffic route in this region. The method for creating a digital map further comprises a step of creating the digital map based on the surrounding area data values, wherein in a first sub-step the radar data values of the respective data sets are combined, starting from the respective trajectories of the vehicles, wherein in a second sub-step the previously combined trajectories and thus the surrounding area features comprised by the radar data values are aligned relative to one another, depending on the boundary features.

A digital map is understood to be a map that is available in the form of (map) data values on a storage medium. The map is designed, for example, in such a way that one or more map layers are comprised, wherein a map layer shows, for example, a map from a bird's eye view (course and position of roads, buildings, landscape features, etc.). This corresponds to a map of a navigation system, for example. A further map layer comprises, for example, a radar map, wherein surrounding area features that are comprised by the radar map are stored with a radar signature. A further map layer comprises, for example, a lidar map, wherein surrounding area features that are comprised by the lidar map are stored with a lidar signature.

In one embodiment of the present invention, the map is designed as a high-precision map. In particular, the high-precision map is designed in such a way that it is suitable for the navigation of an automated vehicle. This means, for example, that the high-precision map is designed to determine a high-precision position of this automated vehicle by comparing stored surrounding area features with detected sensor data values of the automated vehicle. For example, the high-precision map comprises these surrounding area features with highly accurate position information (coordinates).

A highly accurate position is a position that is so precise within a given coordinate system, for example WGS84 coordinates, that this position does not exceed a maximum permissible blurring. The maximum blurring can depend on the surrounding area, for example. Furthermore, the maximum blurring can depend, for example, on whether a vehicle is operated manually or in a partially, highly or fully automated manner (corresponding to one of the SAE levels 1 to 5). In principle, the maximum blurring is so low that safe operation of the automated vehicle is guaranteed in particular. For fully automated operation of the automated vehicle, the maximum blurring is, for example, in the order of approximately 10 centimeters.

Creating the map based on the surrounding area data values is understood to mean, for example, that surrounding area features that are comprised by the surrounding area data values are newly integrated into a base map according to their position and/or surrounding area features already comprised by the base map are removed or adapted accordingly. Here, a base map is understood to mean in particular a digital map (as described above). So that these surrounding area features can be inserted according to their position, i.e. at the right place on the map, the radar data values of the respective data sets are combined here in a first sub-step, starting from the respective trajectories of the vehicles. This means that the radar data values (or the surrounding area represented by the radar data values) are aligned with one another based on the respective trajectories. However, deviations can occur, particularly in the lateral direction. Therefore, in a second sub-step, the previously combined trajectories and thus the surrounding area features comprised by the radar data values are aligned relative to one another—in particular in the lateral direction—depending on the boundary features. Subsequently, the map can be created as described above, or an existing map can be adapted.

A traffic route is, for example, a single-lane or multi-lane road. Boundary features along the traffic route are understood to mean, for example, crash barriers and/or road markings (road boundary lines). A region along a traffic route is understood to mean, for example, the traffic route itself along with a strip to the left and/or right of the traffic route. The width of the strip depends, for example, on the specific configuration of the surrounding area and/or the sensor range of the individual vehicles. As a rule, this strip comprises surrounding area features such as traffic signs, etc.

In relation to a map, a trajectory is, for example, a line that the vehicle follows or a route through which the vehicle travels.

The method according to the present invention may advantageously achieves the object of providing a method for creating a digital map. This object may be achieved by means of the method according to the present invention, in that the method for creating is carried out in two sub-steps. The alignment of different data sets in relation to one another—starting from the respective trajectories of the vehicles—poses a particular challenge when creating maps. This problem is advantageously solved here in that in a first sub-step the alignment is carried out depending on the radar data values (this usually enables good alignment in the longitudinal direction) and in a second sub-step the alignment is finally carried out depending on the boundary features (this usually allows good alignment in the lateral direction).

According to an example embodiment of the present invention, the first device, in particular a computing unit, is configured to carry out all the steps of the method for creating a digital map. A computing unit is, for example, a server or a server network, or a cloud.

According to an example embodiment of the present invention, the first device or the computing unit comprises a processor, a main memory, a storage medium and a suitable software for carrying out the method according to one of the methods described herein. Furthermore, the first device comprises an interface for sending and receiving data values by means of a wired and/or wireless connection, for example with corresponding vehicle apparatuses (control devices, communication apparatuses, surrounding area sensors, navigation system, etc.) and/or other vehicle-external apparatuses (server, cloud, etc.).

According to an example embodiment of the present invention, the method for operating an automated vehicle along a traffic route comprises a step of detecting boundary features of the traffic route, wherein the boundary features are detected by means of at least one video sensor of the automated vehicle, a step of detecting a surrounding area of the automated vehicle along the traffic route, wherein the surrounding area is detected by means of at least one radar sensor of the automated vehicle, and a step of providing a digital map which comprises a first sub-map and a second sub-map, wherein the first sub-map corresponds to a radar map which comprises surrounding area features in the surrounding area along the traffic route by means of a radar signature, wherein the second sub-map comprises the boundary features by means of a video signature. The method for operating an automated vehicle along a traffic route further comprises a step of determining a first position of the automated vehicle depending on a first comparison of the detected surrounding area with the first sub-map, a step of determining a second position depending on the first position and depending on a second comparison of the detected boundary features with the second sub-map, and a step of operating the automated vehicle along the traffic route depending on the second position.

An automated vehicle is understood to mean a vehicle according to one of the SAE levels 1 to 5 (see standard SAE J3016).

Operation of the automated vehicle is understood to mean, for example, executing lateral and/or longitudinal control. In one possible embodiment, the operation alternatively or additionally comprises the execution of safety-related functions ("arming" an airbag, fastening seat belts, etc.) and/or other (driver assistance) functions (lane departure warning, navigation system, etc.). Operation of the automated vehicle along the traffic route depending on a position is understood to mean, for example, that a trajectory is determined within the traffic route and then traveled automatically.

A step of determining a first position of the automated vehicle depending on a first comparison of the detected surrounding area with the first sub-map is understood to mean that the detected surrounding area with the expected surrounding area features, which are taken from the map, determines the first position of the automated vehicle, starting from distances and/or relative positions of the vehicle to the corresponding surrounding area features (landmarks). In a further embodiment, other information (GNSS, odometry, etc.) can also be used to determine the first position. However, this first position has a certain degree of blurring and therefore also a certain safety risk if this first position is used to operate the automated vehicle. Therefore, depending on the first position and depending on a second comparison of the detected boundary features with the second sub-map, the second position is then determined. For example, the first position is corrected in the lateral direction based on the boundary features. This then corresponds to the second position, which therefore has less blurring or is more precise than the first position.

The method according to the present invention may advantageously achieve the object of providing a method for operating an automated vehicle along a traffic route. This object is achieved by means of the method according to the present invention, in that the position of the automated vehicle is determined in a two-stage method. This enables more precise localization of the automated vehicle.

Preferably, the digital map is based on the above-mentioned method according to the present invention for creating a digital map.

According to an example embodiment of the present invention, the second device, in particular a control device, is configured to carry out all the steps of the method for operating an automated vehicle along a traffic route.

According to an example embodiment of the present invention, a computer program comprising instructions that, when the computer program is executed by a computer, cause the computer to perform a method according to any one of the methods according to the present invention for operating an automated vehicle along a traffic route, is further provided. In one embodiment, the computer program corresponds to the software comprised in the second device.

Furthermore, a machine-readable storage medium on which the computer program is stored is provided according to the present invention.

Advantageous further embodiments of the present invention are disclosed herein.

BRIEF DESCRIPTION OF THE DRAWINGS

Exemplary embodiments of the present invention are illustrated in the figures and explained in more detail in the following description.

DETAILED DESCRIPTION OF EXAMPLE EMBODIMENTS

Figure 1:
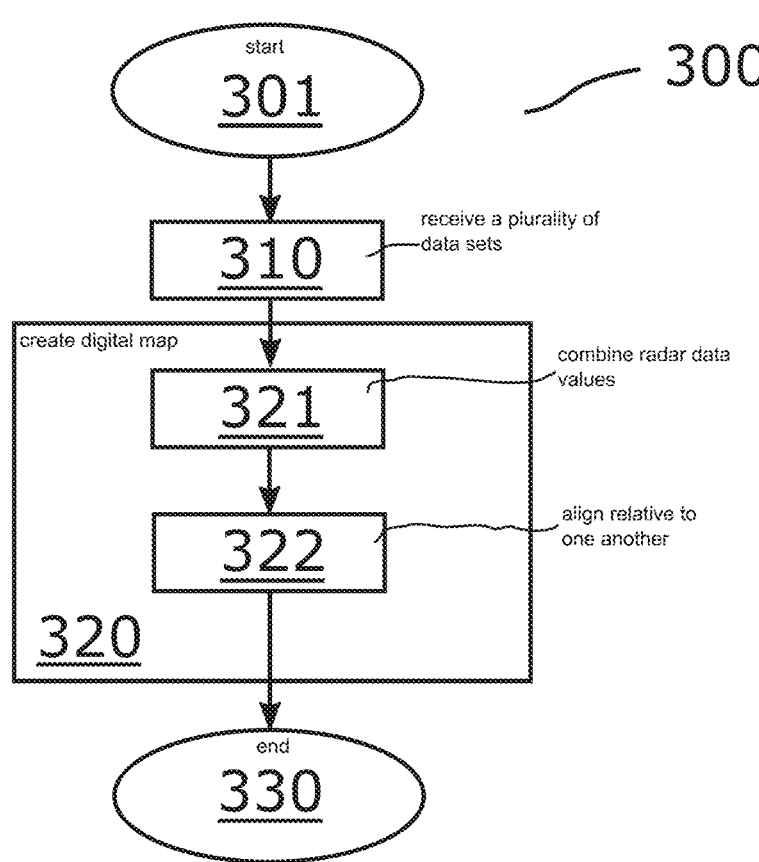
FIG. 1 shows an exemplary embodiment of the method according to the present invention for creating a digital map in the form of a flow chart.

FIG. 1 shows an exemplary embodiment of a method 300 for creating 320 a digital map, wherein the digital map represents at least one region along a traffic route.

In step 301, the method 300 starts.

In step 310, a plurality of data sets are received, wherein each data set is transmitted by a vehicle traveling through the region along its own trajectory. Each data set comprises the vehicle's own trajectory and surrounding area data values, wherein the surrounding area data values comprise radar data values and video data values, wherein the radar data values are detected by means of a radar sensor and the radar data values represent surrounding area features in this region by means of a radar signature, wherein the video data values are detected by means of a video sensor and represent at least boundary features along the traffic route in this region.

In step 320, the digital map is created based on the surrounding area data values. In a first sub-step 321, the radar data values of the respective data sets are combined, starting from the respective trajectories of the vehicles, and in a second sub-step 322, the previously combined trajectories and thus the surrounding area features comprised by the radar data values are aligned relative to one another, depending on the boundary features.

In step 330, the method 300 ends.

Figure 2:
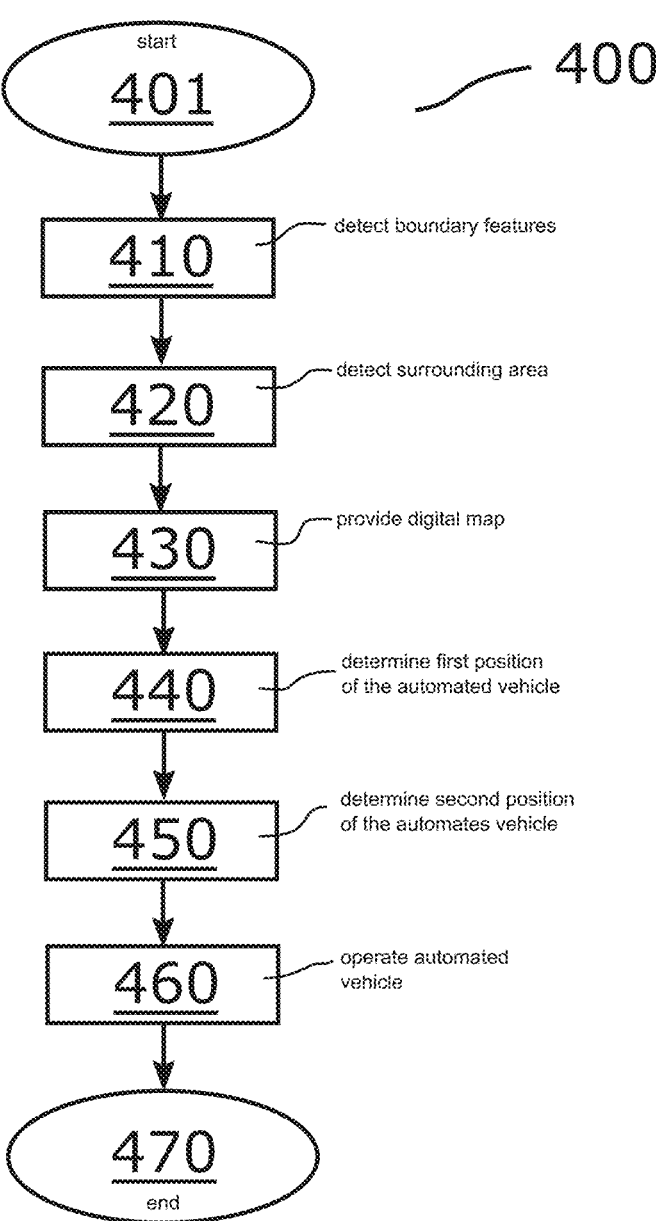
FIG. 2 shows an exemplary embodiment of the method according to the present invention for operating an automated vehicle along a traffic route in the form of a flow chart.

FIG. 2 shows an exemplary embodiment of a method 400 for operating 460 an automated vehicle along a traffic route.

In step 401, the method 400 starts.

In step 410, boundary features of the traffic route are detected, wherein the boundary features are detected by means of at least one video sensor of the automated vehicle.

In step 420, a surrounding area of the automated vehicle along the traffic route is detected, wherein the surrounding area is detected by means of at least one radar sensor of the automated vehicle.

In step 430, a digital map which comprises a first sub-map and a second sub-map is provided, wherein the first sub-map corresponds to a radar map which comprises surrounding area features in the surrounding area along the traffic route by means of a radar signature, wherein the second sub-map comprises the boundary features by means of a video signature.

In step 440, a first position of the automated vehicle is determined depending on a first comparison of the detected surrounding area with the first sub-map.

In step 450, a second position is determined depending on the first position and depending on a second comparison of the detected boundary features with the second sub-map.

In step 460, the automated vehicle is operated along the traffic route depending on the second position.

In step 470, the method 400 ends.

What is claimed is:

1. A method for operating an automated vehicle along a traffic route, comprising the following steps:
   detecting boundary features of the traffic route, wherein the boundary features are detected using at least one video sensor of the automated vehicle;
   detecting a surrounding area of the automated vehicle along the traffic route, wherein the surrounding area is detected using at least one radar sensor of the automated vehicle;
   providing a digital map which includes a first sub-map and a second sub-map, wherein the first sub-map corresponds to a radar map which includes surrounding area features in the surrounding area along the traffic route via a radar signature, and wherein the second sub-map includes boundary features via a video signature;
   determining a first position of the automated vehicle by performing a first comparison that compares of the detected surrounding area with the first sub-map;
   determining a second position of the automated vehicle by correcting a lateral deviation of the first position using a second comparison that compares of the detected boundary features with the second sub-map, wherein the second position retains a longitudinal position of the automated vehicle identified in the first position and includes a lateral position of the automated vehicle determined from the second comparison; and
   operating the automated vehicle along the traffic route depending on the second position.

2. The method according to claim 1, wherein the digital map that is provided:
   represents at least one region along the traffic route;
   is based on a plurality of data sets that, each;
   is transmitted from a respective transmitting vehicle that travels through the region along a respective trajectory of the respective transmitting vehicle;
   includes the respective trajectory of the respective transmitting vehicle and surrounding area data values, the surrounding area data values including radar data values and video data values, the radar data values being detected using a radar sensor, the radar data values representing surrounding area features in the region via a radar signature, the video data values being detected using a video sensor and representing at least boundary features along the traffic route in the region; and
   is a map that is based on:
   a combination of the radar data values of the respective data sets, starting from the respective trajectories of the transmitting vehicles; and
   an alignment of the combined radar data values corresponding to the respective trajectories, and thus the surrounding area features represented by the radar data values, relative to one another, the alignment depending on the boundary features.

3. The method according to claim 1, wherein the digital map is created by:
   receiving a plurality of data sets, wherein each respective data set of the data sets is transmitted from a respective vehicle that travels through the region along a respective trajectory of the respective vehicle, wherein each respective data set includes the respective trajectory of the respective vehicle and surrounding area data values, wherein the surrounding area data values include radar data values and video data values, wherein the radar data values are detected using a radar sensor and the radar data values represent surrounding area features in the region via a radar signature, wherein the video data values are detected using a video sensor and represent at least boundary features along the traffic route in the region; and
   creating the digital map based on the surrounding area data values of the data sets, wherein in a first sub-step, the radar data values of the respective data sets are combined, starting from the respective trajectories of the vehicles, wherein in a second sub-step, previously combined trajectories and thus the surrounding area features represented by the radar data values are aligned relative to one another, depending on the boundary features.

4. A device, comprising:
   a control device configured to operate an automated vehicle along a traffic route, the control device configured to:
   detect boundary features of the traffic route, wherein the boundary features are detected using at least one video sensor of the automated vehicle;
   detect a surrounding area of the automated vehicle along the traffic route, wherein the surrounding area is detected using at least one radar sensor of the automated vehicle;
   provide a digital map which includes a first sub-map and a second sub-map, wherein the first sub-map corresponds to a radar map which includes surrounding area features in the surrounding area along the traffic route via a radar signature, and wherein the second sub-map includes boundary features via a video signature;

determine a first position of the automated vehicle by performing a first comparison that compares the detected surrounding area with the first sub-map;

determine a second position of the automated vehicle by correcting a lateral deviation of the first position using a second comparison that compares the detected boundary features with the second sub-map, wherein the second position retains a longitudinal position of the automated vehicle identified in the first position and includes a lateral position of the automated vehicle determined from the second comparison; and operate the automated vehicle along the traffic route depending on the second position.

5. The first device according to claim 4, wherein the digital map that is provided:

represents at least one region along the traffic route;

is based on a plurality of data sets that each:

is transmitted from a respective transmitting vehicle that travels through the region along a respective trajectory of the respective transmitting vehicle; and includes the respective trajectory of the respective transmitting vehicle and surrounding area data values, the surrounding area data values including radar data values and video data values, the radar data values being detected using a radar sensor, the radar data values representing surrounding area features in the region via a radar signature, the video data values being detected using a video sensor and representing at least boundary features along the traffic route in the region;

is a map that is based on:

a combination of the radar data values of the respective data sets, starting from the respective trajectories of the transmitting vehicles; and an alignment of the combined radar data values corresponding to the respective trajectories, and thus the surrounding area features represented by the radar data values, relative to one another, the alignment depending on the boundary features.

6. A non-transitory machine-readable storage medium on which is stored a computer program for operating an automated vehicle along a traffic route, the computer program, when executed by a computer, causing the computer to perform the following steps:

detecting boundary features of the traffic route, wherein the boundary features are detected using at least one video sensor of the automated vehicle;

detecting a surrounding area of the automated vehicle along the traffic route, wherein the surrounding area is detected using at least one radar sensor of the automated vehicle;

providing a digital map which includes a first sub-map and a second sub-map, wherein the first sub-map corresponds to a radar map which includes surrounding area features in the surrounding area along the traffic route via a radar signature, and wherein the second sub-map includes boundary features via a video signature;

determining a first position of the automated vehicle by performing a first comparison that compares the detected surrounding area with the first sub-map;

determining a second position of the automated vehicle by correcting a lateral deviation of the first position using a second comparison that compares the detected boundary features with the second sub-map, wherein the second position retains a longitudinal position of the automated vehicle identified in the first position and includes a lateral position of the automated vehicle determined from the second comparison; and operating the automated vehicle along the traffic route depending on the second position.

* * * * *